(12) United States Patent
Chen et al.

(10) Patent No.: US 11,706,141 B2
(45) Date of Patent: *Jul. 18, 2023

(54) SYSTEMS AND METHODS FOR MAINTAINING CONSISTENCY BETWEEN INTERFACES OF LOCALLY SOURCED PACKETS

(71) Applicant: Cisco Technology, Inc., San Jose, CA (US)

(72) Inventors: Enke Chen, San Jose, CA (US); Jun Zhuang, Menlo Park, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,590

(22) Filed: May 23, 2022

(65) Prior Publication Data
US 2022/0286396 A1   Sep. 8, 2022

Related U.S. Application Data

(63) Continuation of application No. 16/800,197, filed on Feb. 25, 2020, now Pat. No. 11,343,188.

(51) Int. Cl.
*H04L 12/741* (2013.01)
*H04L 45/745* (2022.01)
*H04L 45/24* (2022.01)

(52) U.S. Cl.
CPC .......... *H04L 45/745* (2013.01); *H04L 45/24* (2013.01)

(58) Field of Classification Search
CPC .......................... H04L 45/745; H04L 45/24
See application file for complete search history.

(56) References Cited

U.S. PATENT DOCUMENTS

| 8,036,226 | B1 * | 10/2011 | Ma .................. H04L 45/00 370/252 |
| 8,972,602 | B2 | 3/2015 | Mithyantha |
| 9,497,075 | B2 | 11/2016 | DeCusatis et al. |
| 10,298,500 | B2 | 5/2019 | Mula et al. |
| 2005/0041590 | A1 | 2/2005 | Olakangil et al. |
| 2006/0184690 | A1 | 8/2006 | Milliken |
| 2013/0286846 | A1 | 10/2013 | Atlas et al. |
| 2014/0016500 | A1 | 1/2014 | Leong et al. |
| 2015/0023352 | A1 | 1/2015 | Yang et al. |
| 2015/0029855 | A1 | 1/2015 | Zheng et al. |
| 2019/0260670 | A1 | 8/2019 | Kulkarni et al. |

* cited by examiner

*Primary Examiner* — Kevin M Cunningham
(74) *Attorney, Agent, or Firm* — Baker Botts L.L.P.

(57) ABSTRACT

In one embodiment, a method includes performing, by a router, a destination address lookup of an IP packet in a Forwarding Information Base (FIB) and identifying, by the router, an equal cost multi-path (ECMP) object from the destination address lookup. The ECMP object includes a plurality of paths for forwarding the IP packet to a destination associated with a destination address. The method further includes determining, by the router, a source interface associated with the IP packet, determining, by the router, that the source interface matches an egress interface associated with a path among the plurality of paths, and communicating, by the router, the IP packet based on the path to the destination using the egress interface.

20 Claims, 3 Drawing Sheets

SYSTEMS AND METHODS FOR MAINTAINING CONSISTENCY BETWEEN INTERFACES OF LOCALLY SOURCED PACKETS

PRIORITY

This application is a continuation, under 35 U.S.C. § 120, of U.S. patent application Ser. No. 16/800,197 filed on Feb. 25, 2020, which is incorporated herein by reference.

TECHNICAL FIELD

This disclosure generally relates to maintaining consistency between interfaces of packets, and more specifically to systems and methods for maintaining consistency between interfaces of locally sourced packets.

BACKGROUND

Equal cost multi-path (ECMP) is a routing strategy that may be utilized by networks even when the network characteristics (e.g., addressing, connectivity, etc.) are not equivalent. In certain situations, the inconsistency between the control plane and the data plane with regard to the egress interface for locally sourced packets is problematic. For example, when ECMP provides for one route to a public network and another route to a private network having a private address, an Internet Protocol (IP) packet with a private address as the source address will not receive a reply from the public network.

DESCRIPTION OF EXAMPLE EMBODIMENTS

Overview

Figure 1:
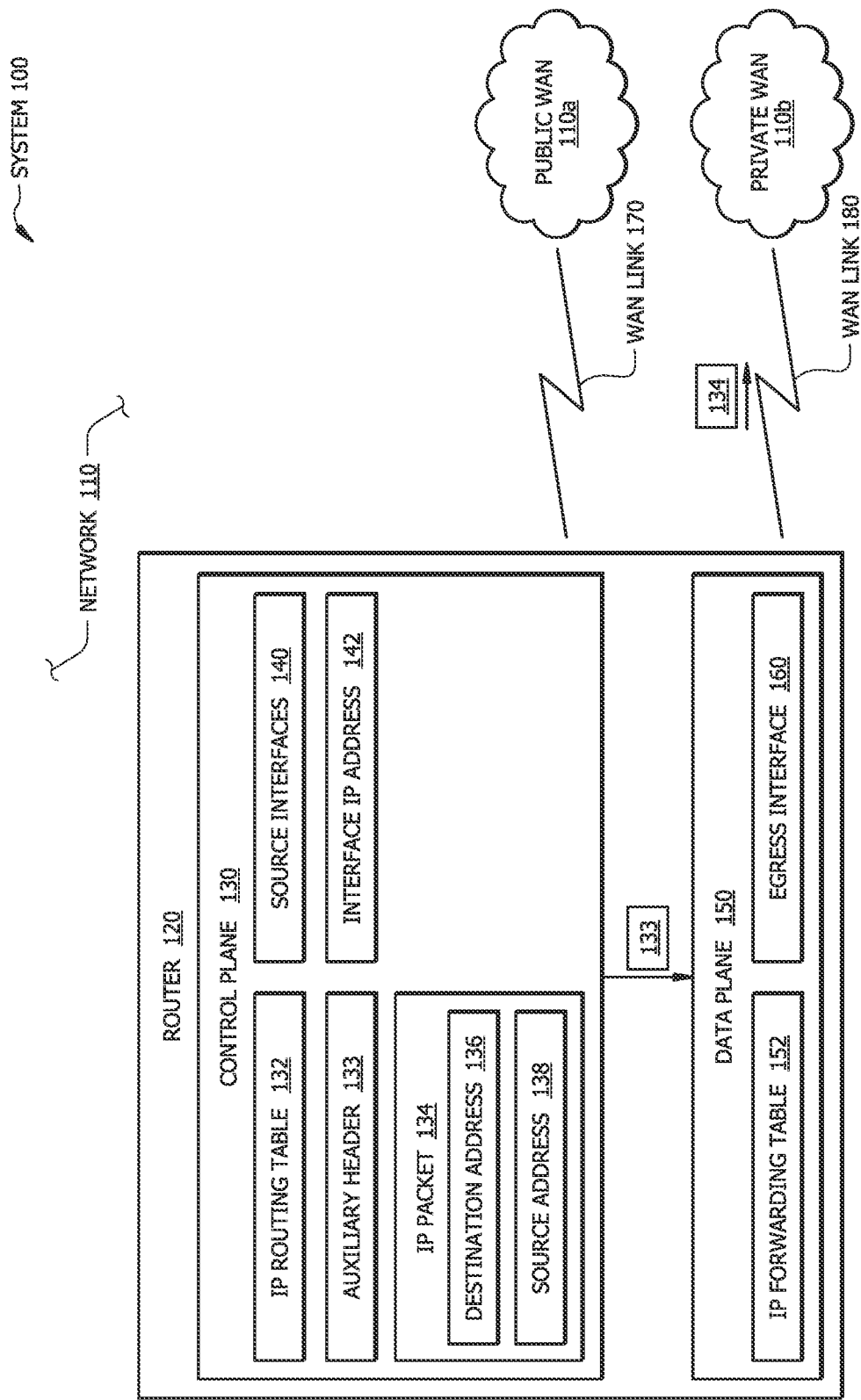
FIG. 1 illustrates an example system for maintaining consistency between interfaces of locally sourced packets.

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including performing a destination address lookup of an IP packet in a Forwarding Information Base (FIB) and identifying an equal cost multi-path (ECMP) object from the destination address lookup. The ECMP object includes a plurality of paths for forwarding the IP packet to a destination associated with a destination address. The operations further include determining a source interface associated with the IP packet, determining that the source interface matches an egress interface associated with a path among the plurality of paths, and communicating the IP packet based on the path to the destination using the egress interface.

In certain embodiments, the operations include detecting an identifier for the source interface within an auxiliary header for the IP packet to determine the source interface associated with the IP packet. In some embodiments, the operations include performing a source address lookup of the IP packet in the FIB to determine the source interface associated with the IP packet. The FIB associates a source address with the source interface. In some embodiments, the operations include performing a source address lookup of the IP packet in a database to determine the source interface associated with the IP packet. The database maps a source address to the source interface.

In certain embodiments, the IP packet is an Internet Protocol version 4 (IPv4) packet or an Internet Protocol Version 6 (IPv6) packet. In some embodiments, the IP packet is a locally sourced IP packet having a private IP source address and the path to the destination includes a wide area network (WAN) having a private IP address. The plurality of paths may include a first path associated with a public IP address and a second path associated with a private IP address. The source interface may be specified by an application running on the router or determined by performing a route lookup in a routing table.

According to another embodiment, a method includes performing, by a router, a destination address lookup of an IP packet in a FIB and identifying, by the router, an ECMP object from the destination address lookup. The ECMP object includes a plurality of paths for forwarding the IP packet to a destination associated with a destination address. The method further includes determining, by the router, a source interface associated with the IP packet, determining, by the router, that the source interface matches an egress interface associated with a path among the plurality of paths, and communicating, by the router, the IP packet based on the path to the destination using the egress interface.

According to yet another embodiment, one or more computer-readable non-transitory storage media embody instructions that, when executed by a processor, cause the processor to perform operations including performing a destination address lookup of an IP packet in a FIB and identifying an ECMP object from the destination address lookup. The ECMP object includes a plurality of paths for forwarding the IP packet to a destination associated with a destination address. The operations further include determining a source interface associated with the IP packet, determining that the source interface matches an egress interface associated with a path among the plurality of paths, and communicating the IP packet based on the path to the destination using the egress interface.

Technical advantages of certain embodiments of this disclosure may include one or more of the following. Embodiments of this disclosure provide operational simplicity and reliability in a networking environment that uses ECMP and a combination of public and private networks. For example, embodiments of this disclosure may maintain consistency between the source interface in the control plane and the egress interface in the data plane of a router, which may prevent an IP packet with a private IP source address from being forwarded to a public network (e.g., the Internet).

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for maintaining consistency between control and forwarding with regard to the egress interface for locally sourced packets.

When a packet is sourced locally in the control plane, the source address for the packet may be calculated from routing and can be randomly chosen from the available paths in the case of ECMP. The data plane traditionally uses a hash algorithm based on the 5-tuples (i.e., source address 138, port number, destination address 136, port number. and the protocol in use) and chooses a path randomly based on the hashed values among the ECMP paths. As such, packets can be forwarded using any of the ECMP paths.

For a locally sourced packet, the packet may be sourced from one interface and forwarded over another interface. When the ECMP paths and interfaces involved have equivalent network properties such as addressing and connectivity, the inconsistency between the source interface in the control plane and the forwarding interface in the data plane may not be an issue. However, this inconsistency may be problematic when the network properties are not equivalent (e.g., when there are two WAN connections, one with a public IP address (without NAT) to the public Internet, and another with a private IP address (with NAT) to a Multi-Protocol Label Switching (MPLS) network). A packet with a private IP address as the source address will not receive a reply from the public Internet. It is thus critical to maintain consistency between the source interface and the forwarding interface for the locally sourced packets in software-defined networking in a wide area network (SD-WAN) or similar environments.

Figure 2:
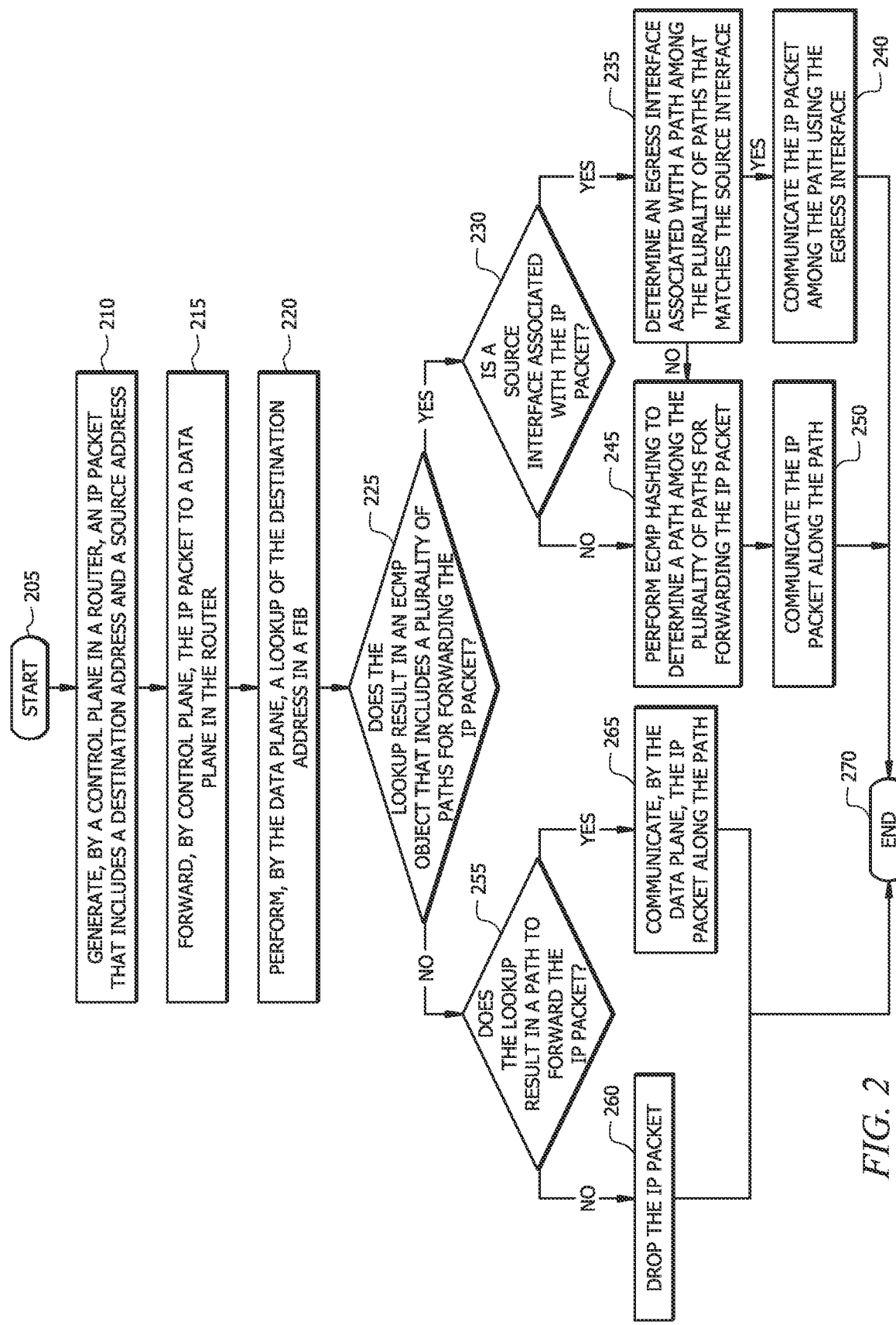
FIG. 2 illustrates an example method for maintaining consistency between interfaces of locally sourced packets.
Figure 3:
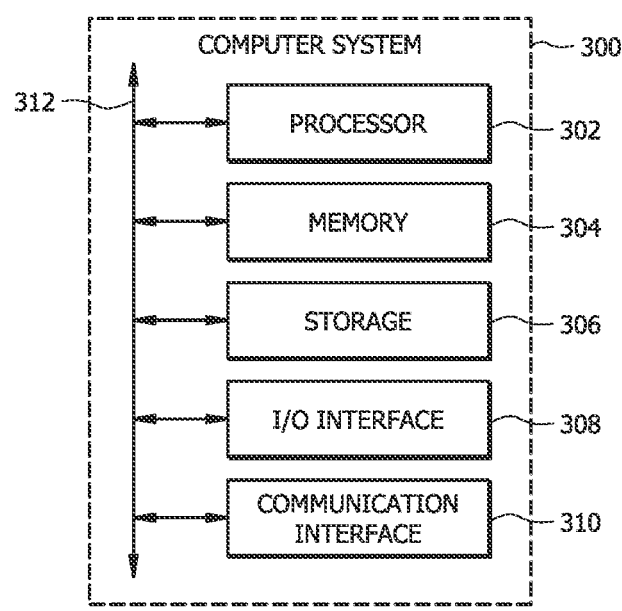
FIG. 3 illustrates an example computer system that may be used by the systems and methods described herein.

Certain embodiments of this disclosure describe systems and methods for maintaining consistency between the source interface and the forwarding interface for a locally sourced packet in the case of ECMP. FIG. 1 shows an example system for maintaining consistency between interfaces of locally sourced packets. FIG. 2 shows an example method for maintaining consistency between interfaces of locally sourced packets. FIG. 3 shows an example computer system that may be used by the systems and methods described herein.

FIG. 1 illustrates an example system 100 for maintaining the consistency between interfaces of locally sourced packets. System 100 or portions thereof may be associated with an entity, which may include any entity, such as a business or company (e.g., a service provider) that maintaining the consistency between interfaces of locally sourced packets. The components of system 100 may include any suitable combination of hardware, firmware, and software. For example, the components of system 100 may use one or more elements of the computer system of FIG. 3. System 100 includes a network 110 and a router 120.

Network 110 of system 100 facilitates communication between components of system 100. For example, network 110 of system 100 may connect one or more routers 120 of system 100. Network 110 may implement SD-WAN technology. SD-WAN is a specific application of software defined networking technology applied to WAN connections (e.g., broadband Internet, 4G, 5G, LTE, MPLS, etc.). Network 110 includes different types of networks 110. In the illustrated embodiment of FIG. 1, network 110 includes public WAN 110a and private WAN 110b.

Public WAN 110a (e.g., the Internet) is a network to which anyone (i.e., the general public) can connect. Access to public WAN 110a may be provided using broadband services such as Digital Subscriber Line (DSL), cable, satellite access, or any other suitable broadband service. WAN link 170 is the connection between router 120 (e.g., egress interface 160) and public WAN 110a. Private WAN 110b is a network in which access is restricted. Private WAN 110b may use MPLS, T1/E1, T3/E3, the Public Switched Telephone Network (PSTN), Integrated Services Digital Network (ISDN), Frame Relay, Asynchronous Transfer Mode (ATM), Very Small Aperture Terminal (VSAT) technology, a combination thereof, or any other suitable technology. Private WAN 110b is associated with a private IP address. In certain embodiments, one or more components of network 110 may use Network Address Translation (NAT) to allow private IP internetworks that use nonregistered IP addresses to connect to a public network (e.g., the Internet). NAT translates private (not globally unique) IP addresses in an internal network into legal addresses. WAN link 180 is the connection between router 120 (e.g., egress interface 160) and private WAN 110b.

While FIG. 1 illustrates certain types of networks 110, this disclosure contemplates any suitable network 110. One or more portions of network 110 may include an ad-hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the PSTN, an LTE network, a cellular telephone network, a combination of two or more of these, or other suitable types of network 110. One or more portions of network 110 may be a communications network, such as a private network, a public network, a connection through Internet, a mobile network, a WI-FI network, a cloud network, etc. Network 110 may include a core network (e.g., a 4G and/or 5G network), an access network, an edge network, an internet service provider (ISP) network, a network service provider (NSP) network, an aggregation network, and the like.

Router 120 of system 100 is a network component that analyzes data being sent across network 110, determines routes for the data to travel network 110 based on the analysis, and communicates the data in accordance with the determined routes. Router 120 is a connection point that can receive, create, store, and/or send data. Router 120 may be managed by an administrator (e.g., a service provider) of one or more networks. Router 120 may recognize, process, and/or forward data to other routers 120 of network 110. In the illustrated embodiment of FIG. 1, router 120 includes a control plane 130 and a data plane 150.

Control plane 130 of router 120 carries signaling traffic and is responsible for routing traffic through network 110. In certain embodiments, control plane 130 is software based and uses a central processing unit (CPU) of router 120. In some embodiments, network 110 utilizes SDN, which decouples control plane 130 and data plane 150 and removes control plane 130 from network hardware.

Control plane 130 may include one or more applications. The applications may be used to manage one or more portions of network 110, manage storage for router 120, manage network security, manage virtual machines, and the like. In the illustrated embodiment of FIG. 1, control plane includes an auxiliary header 133 for IP packet 134. Auxiliary header 133 is used to carry a source interface identifier (e.g., interface IP address 142). Auxiliary header 133 is shared between control plane 130 and data plane 150.

In certain embodiments, control plane 130 generates IP packet 134. For example, IP packet 134 may be sourced locally by an application of control plane 130. IP packet 134 is a formatted unit that carries data using Internet protocols. IP packet 134 may use any suitable network layer protocol. For example, IP packet 134 may be an IPv4 packet, an IPv6 packet, and the like. IP packet 134 includes a header that contains instructions on the data that is carried in IP packet 134. The header of IP packet 134 includes a destination address 136 and a source address 138. Destination address 136 is the address of the networking component that is to receive IP packet 134. Source address 138 is the address of where IP packet 134 came (or originated) from. In certain embodiments, source address 138 identifies source interface 140.

In certain embodiments, source address 138 of IP packet 134 is specified by the application that generated IP packet 134. For example, source address 138 may be specified via "bind( )" in Linux. As another example, source address 138 may be specified via "interface" in Internetwork Operating System (IOS). If source address 138 of IP packet 134 is not specified by an application, control plane 130 may perform a route lookup in an IP routing table 132 to determine source address 138. Control plane 130 may perform the route lookup using a Linux kernel or IOS. In some embodiments, control plane 130 determines source interface 140 from source address 138. In certain embodiments, control plane 130 determines an identifier (e.g., interface IP address 142) for source interface 140. The identifier may be carried by auxiliary header 133 received from control plane 130. The identifier of source interface 140 may be any representation (e.g., an IP address, a number, a letter, a character, a string of one or more of the aforementioned, etc.) that identifies source interface 140.

IP routing table 132 of control plane 130 defines how to route IP packet 134. In certain embodiments, IP routing table 132 is a routing information base (RIB). IP routing table 132 includes information about the topology of network 110. Router 120 may generate IP routing table 132 using one or more routing protocols. IP routing table 132 may include a list of entries. The entries may be statically generated by non-automatic means or dynamically generated using routing protocols and/or associated network topology discovery procedures. The entries may include one or more destination addresses 136, source addresses 138, network identifications, metrics, next hops, etc.

Source interface 140 of control plane 130 is a point of interconnection between router 120 and network 110 (e.g., public WAN 110a or private WAN 110b). Source interface 140 may be a physical component (e.g., a network interface card (NIC)) or implemented in software (e.g., a virtual or loopback interface). Source interface 140 may represent a switchport, a routed port, an access port, a trunk port, an EtherChannel, and the like. In certain embodiments, source interface 140 is represented by an identifier (e.g., a port number) of the interface. Source interface 140 may have at least one IP address configured on it.

In certain embodiments, source interface 140 is assigned one or more interface IP addresses 142. Interface IP address 142 may be assigned to source interface 140 statically or dynamically (e.g., via a Dynamic Host Configuration Protocol (DHCP)). In some embodiments, interface IP address 142 is used to map source addresses 138 to source interfaces 140. When interface IP address 142 assigned to source interface 140 matches source address 138 in IP packet 134, source interface 140 is considered associated with IP packet 134.

Data plane 150 of router 120 is a forwarding plane that is responsible for routing packets in accordance with a path. Data plane 150 uses an IP forwarding table 152 (e.g., a FIB) to make IP destination prefix-based switching decisions. IP forwarding table 152 may include the forwarding information contained in IP routing table 132. When routing or topology changes occur in network 110 and IP routing table 132 is updated, those changes may be reflected in IP forwarding table 152. IP forwarding table 152 may include one or more destination addresses 136, source addresses 138, next-hop address information, and the like. IP forwarding table 152 maps destination addresses 136 to egress interfaces 160. In certain embodiments, IP forwarding table 152 maps source addresses 138 to source interfaces 140. IP forwarding table 152 may be updated statically and/or dynamically.

Egress interface 160 of data plane 150 is a point of interconnection between router 120 and network 110 (e.g., public WAN or private WAN 110b). Egress interface 160 may be a physical component (e.g., a network interface card (NIC)) or implemented in software (e.g., a virtual or loopback interface). Egress interface 160 may represent a switchport, a routed port, an access port, a trunk port, an EtherChannel, and the like. In certain embodiments, egress interface 160 is represented by an identifier (e.g., a port number) of the interface. Egress interface 160 may have at least one IP address configured on it.

Data plane 150 of router 120 receives IP packet 134 from control plane 130 of router 120. Data plane 150 performs a lookup of destination address 136 of IP packet 134 in IP forwarding table 152. Data plane 150 may determine that the lookup of destination address 136 in IP packet 134 resulted in zero paths, one path, or a plurality of paths. If data plane 150 determines that the lookup resulted in zero paths, data plane 150 drops IP packet 134. For example, data plane 150 may determine to discard IP packet 134 if no paths are available to the destination (e.g., router, server, etc.) associated with destination address 136. If data plane 150 determines that the lookup resulted in only one path, data plane 150 communicates IP packet 134 along the only available path. For example, data plane 150 may determine that the only available path to the destination associated with destination address 136 is through private WAN 110b and, as a result, route IP packet 134 along the only available path through private WAN 110b.

In certain embodiments, data plane 150 identifies an ECMP object from the destination address lookup. The ECMP object includes a plurality of paths for forwarding IP packet 134. The ECMP object may be formed when IP routing table 132 includes multiple next-hop addresses for the same destination with equal cost (e.g., same preference and metric values). The plurality of paths may include any suitable number (e.g., four or eight) of paths to the destination associated with destination address 136. Each path may be associated with a different egress interface 160. Egress interface 160 for each path is programmed when the path is created. In certain embodiments, the ECMP object includes at least one path through a public network (e.g., public WAN 110a) and at least one path through a private network (e.g., private WAN 110b).

In certain embodiments, if data plane 150 determines that the lookup resulted in an ECMP object that includes a plurality of paths for forwarding IP packet 134, data plane 150 determines whether source interface 140 is associated with IP packet 134. For example, data plane 150 may determine that source interface 140 associated with a private address is associated with IP packet 134. If data plane 150 determines source interface 140 associated with IP packet 134, data plane 150 selects the ECMP path having egress interface 160 that matches source interface 140 to maintain consistency between the source and forwarding interfaces. Data plane 150 communicates IP packet 134 using egress interface 160 that matches source interface 140. For example, data plane 150 may determine that egress interface 160 associated with a private address matches source interface 140 associated with the private address, and data plane 150 may communicate IP packet 134 along WAN link 180 to private WAN 110b using egress interface 160. Source interface 140 may be identified by data plane 150 using one of the following three approaches.

In the first approach, data plane 150 detects an identifier for source interface 140 in auxiliary header 133 for IP packet 134 to determine source interface 140 associated with IP packet 134. For example, control plane 130 may include an identification of source interface 140 (as specified by an application that generated IP packet 134) in auxiliary header 133 for IP packet 134 such that the identification source interface 140 is carried along with IP packet 134 to data plane 150. As another example, control plane 130 may perform a route lookup in IP routing table 132 to obtain source interface 140 and include the obtained identification of source interface 140 in auxiliary header 133 for IP packet 134 such that the identification of source interface 140 is carried along with auxiliary header 133 to data plane 150. Data plane 150 may then directly retrieve the identification of source interface 140 from auxiliary header 134 for IP packet 134 and use the identification of source interface 140 to select an ECMP path that has egress interface 160 that matches source interface 140.

In the second approach, data plane 150 performs a lookup in IP forwarding table 152 for source address 138 in IP packet 134 to determine source interface 140 associated with IP packet 134. In certain embodiments, IP forwarding table 152 associates a particular source interface 140 with each interface host route entry. For example, IP forwarding table 152 may include a list of source addresses 138 and associated source interfaces 140 such that when data plane 150 performs the lookup in IP forwarding table 152 for source address 138, the row of IP forwarding table 152 that includes the entry for interface IP address 142 also includes an entry for source interface 140. Data plane 150 may then use the entry of source interface 140 to select an ECMP path that has egress interface 160 that matches source interface 140.

In the third approach, data plane 150 performs a lookup in a database for source address 138 in IP packet 134 to determine source interface 140 associated with IP packet 134. In certain embodiments, router 120 (e.g., data plane 150 of router 120) populates a database with a mapping of interface IP addresses 142 to source interfaces 140. The database, which is separate from IP forwarding table 152, may include a list of source addresses 138 and associated source interfaces 140 such that when data plane 150 performs the lookup in the database for source address 138, the row in the database that includes the entry for source address 138 also includes an entry for source interface 140. Data plane 150 may then use the entry of source interface 140 to select an ECMP path that has egress interface 160 that matches source interface 140.

In certain embodiments, data plane 150 of router 120 is unable to determine source interface 140 associated with IP packet 134. For example, control plane 130 may not include an identifier for source interface 140 for IP packet 134, IP forwarding table 152 may not associate source addresses 138 with source interface 140, and/or data plane 150 may not populate a database mapping source address 138 to source interface 140. If data plane 150 determines that a lookup of destination address 136 in IP forwarding table 152 resulted in an ECMP object that includes a plurality of paths for forwarding IP packet 134 but is unable to determine source interface 140 associated with IP packet 134, data plane 150 performs traditional ECMP hashing to determine an ECMP path for forwarding IP packet 134. For example, data plane 150 may perform a hash on the 5-tuples (i.e., source address 138, port number, destination address 136, port number. and the protocol in use) and choose a path randomly based on the hashed values among the ECMP paths. Data plane 150 then communicates IP packet 134 based on the chosen ECMP path.

In operation, control plane 130 of router 120 generates IP packet 134 that includes destination address 136 and source address 138. Control plane 130 forwards IP packet 134 to data plane 150 of router 120. Data plane 150 performs a lookup of destination address 136 in IP forwarding table 152 and determines whether the lookup results in no available paths, one available path, or an ECMP object that includes a plurality of paths for forwarding IP packet 134 to the destination associated with destination address 136. If the lookup results in no paths, data plane 150 drops IP packet 134. If the lookup results in only one path, data plane 150 communicates IP packet 134 along the only available path to the destination associated with destination address 136. If the lookup results in an ECMP object with a plurality of paths, data plane 150 determines whether source interface 140 is associated with IP packet 134 using one of the following three approaches. In the first approach, data plane 150 detects an identifier for source interface 140 in auxiliary header 133 for IP packet 134 to determine source interface 140 associated with IP packet 134. In the second approach, data plane 150 performs a lookup in IP forwarding table 152 for source address 138 included in IP packet 134 to determine source interface 140 associated with IP packet 134. In the third approach, data plane 150 performs a lookup in a database for source address 138 included in IP packet 134 to determine source interface 140 associated with IP packet 134. If data plane 150 determines source interface 140 associated with IP packet 134, data plane 150 selects the ECMP path having egress interface 160 that matches source interface 140 to maintain consistency between the source and forwarding interfaces. If data plane 150 is unable to determine source interface 140 associated with IP packet 134, data plane 150 performs traditional ECMP hashing to determine an ECMP path for forwarding IP packet 134 and communicates IP packet 134 based on the determined path ECMP path. As such, system 100 of FIG. 1 may be used to maintain consistency between interfaces of locally sourced packets in the case of ECMP.

Although FIG. 1 illustrates a particular arrangement of network 110, public WAN 110a, private WAN 110b, router 120, control plane 130, IP routing table 132, IP packet 134, source interface 140, data plane 150, IP forwarding table 152, egress interface 160, WAN link 170, and WAN link 180, this disclosure contemplates any suitable arrangement of network 110, public WAN 110a, private WAN 110b, router 120, control plane 130, IP routing table 132, IP packet 134, source interface 140, data plane 150, IP forwarding table 152, egress interface 160, WAN link 170, and WAN link 180. Although FIG. 1 illustrates a particular number of networks 110, public WANs 110a, private WANs 110b, routers 120, control planes 130, IP routing tables 132, IP packets 134, source interfaces 140, data planes 150, IP forwarding tables 152, egress interfaces 160, WAN links 170, and WAN links 180, this disclosure contemplates any suitable number of networks 110, public WANs 110a, private WANs 110b, routers 120, control planes 130, IP routing tables 132, IP packets 134, source interfaces 140, data planes 150, IP forwarding tables 152, egress interfaces 160, WAN links 170, and WAN links 180.

FIG. 2 illustrates an example method 200 for maintaining consistency between interfaces of locally sourced packets. Method 200 begins at step 205. At step 210, a control plane (e.g., control plane 130 of FIG. 1) in a router (e.g., router 120 of FIG. 1) generates an IP packet (e.g., IP packet 134 of FIG. 1). The generated IP packet is a locally sourced IP packet that includes a destination address (e.g., destination address 136 of FIG. 1) and a source address (e.g., source address 138 of FIG. 1). In certain embodiments, the control plane determines a source interface (e.g., source interface 140 of FIG. 1) associated with the IP packet and includes an identifier for the source interface in the IP packet. Method 200 then moves from step 210 to step 215. At step 215, the control plane of the router forwards the IP packet, which includes the destination address, the source address, and potentially an identification of the source interface, to a data plane (e.g., data plane 150 of FIG. 1) in the router. Method 200 then moves from step 215 to step 220, where the data plane performs a lookup of the destination address of the IP packet in a FIB. Method 200 then moves from step 220 to step 225.

At step 225 of method 200, the data plane of the router determines whether the lookup resulted in an ECMP object that includes a plurality of paths for forwarding the IP packet to the destination associated with the destination address. For example, the data plane may determine that the lookup resulted in an ECMP object having at least one path associated with an interface having a public IP address and at least one path associated with an interface having a private IP address. If the data plane of the router determines that the lookup resulted in an ECMP object that includes a plurality of paths for forwarding the IP packet, method 200 moves from step 225 to step 230.

At step 230 of method 200, the data plane determines whether a source interface (e.g., source interface 140 of FIG. 1) is associated with the IP packet. For example, the data plane may detect an identifier (e.g., interface IP address 142) for the source interface within an auxiliary header (e.g., auxiliary header 133 of FIG. 1) for the IP packet to determine the source interface associated with the IP packet. As another example, the data plane may perform a lookup in the IP forwarding table (e.g., a FIB table) for the source address included in the IP packet to determine the source interface associated with the IP packet. As still another example, the data plane may perform a lookup in a database that is separate from the IP forwarding table for the source address included in the IP packet to determine the source interface associated with the IP packet.

If, at step 230, the data plane determines that a source interface is associated with the IP packet, method 200 moves from step 230 to step 235, where the data plane of the router determines whether an egress interface (e.g., egress interface 160 of FIG. 1) associated with a path among the plurality of paths matches the source interface. For example, the data plane may determine that an egress interface associated with a path through a private WAN (e.g., private WAN 110b of FIG. 1) matches the source interface. If the data plane determines that an egress interface does not match the source interface, method 200 moves from step 235 to step 245, where the data plane performs traditional ECMP hashing to determine an ECMP path for forwarding the IP packet. Method 200 then moves from step 245 to step 250, where the data plane communicates the IP packet along the randomly determined ECMP path. Method 200 then moves from step 250 to step 270, where method 200 ends.

If, at step 235, the data plane determines that an egress interface matches the source interface, method 200 moves from step 235 to step 240, where the data plane of the router communicates the IP packet based on the path using the egress interface. Method 200 then moves from step 240 to step 270, where method 200 ends. As such, method 200 of FIG. 2 may be used to maintaining consistency between interfaces of locally sourced packets in the case of ECMP.

If, at step 230, the data plane of the router determines that a source interface is not associated with the IP packet, method 200 moves from step 230 to step 245, where the data plane performs traditional ECMP hashing to determine an ECMP path for forwarding the IP packet. Method 200 then moves from step 245 to step 250, where the data plane communicates the IP packet along the randomly determined ECMP path. Method 200 then moves from step 250 to step 270, where method 200 ends.

If, at step 225, the data plane of the router determines that the lookup did not result in an ECMP object that includes a plurality of paths for forwarding the IP packet, method 200 moves from step 225 to step 255, where the data plane determines whether the lookup resulted in a path to forward the IP packet. If the data plane determines that the lookup did not result in a path to forward the IP packet, method 200 moves from step 255 to step 260, where the data plane drops the IP packet. If, at step 255, the data plane determines that the lookup resulted in a path to forward the IP packet, method 200 moves from step 255 to step 265, where the data plane communicates the IP packet along the path. Method 200 then moves from steps 260 and 265 to step 270, where method 200 ends.

Although this disclosure describes and illustrates an example method 200 for maintaining consistency between interfaces of locally sourced packets including the particular steps of the method of FIG. 2, this disclosure contemplates any suitable method 200 for maintaining consistency between interfaces of locally sourced packets, including any suitable steps, which may include all, some, or none of the steps of the method of FIG. 2, where appropriate. Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a LTE network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A network element, comprising:
one or more processors; and
one or more computer-readable non-transitory storage media coupled to the one or more processors and comprising instructions that, when executed by the one or more processors, cause the network element to perform operations comprising:
identifying a first path and a second path for forwarding an IP packet to a destination associated with a destination address;
determining that the first path is associated with a private network and the second path is associated with a public network;
determining, in response to determining that the first path is associated with the private network and the second path is associated with the public network, a source interface associated with the IP packet;
determining that the source interface matches an egress interface associated with the first path; and
communicating the IP packet based on the first path to the destination using the egress interface.

2. The network element of claim 1, the operations further comprising detecting an identifier for the source interface within an auxiliary header for the IP packet to determine the source interface associated with the IP packet.

3. The network element of claim 1, the operations further comprising performing a source address lookup of the IP packet in a Forwarding Information Base (FIB) to determine the source interface associated with the IP packet, wherein the FIB associates a source address with the source interface.

4. The network element of claim 1, the operations further comprising performing a source address lookup of the IP packet in a database to determine the source interface associated with the IP packet, wherein the database maps a source address to the source interface.

5. The network element of claim 1, wherein:
the IP packet is an Internet Protocol version 4 (IPv4) packet or an Internet Protocol Version 6 (IPv6) packet;
the IP packet is a locally sourced IP packet having a private IP source address; and
the first path to the destination includes a wide area network (WAN) having a private IP address.

6. The network element of claim 1, wherein:
the first path is associated with a private IP address; and
the second path is associated with a public IP address.

7. The network element of claim 1, wherein the source interface is:
specified by an application running on the router; or
determined by performing a route lookup in a routing table.

8. A method, comprising:
identifying a first path and a second path for forwarding an IP packet to a destination associated with a destination address;
determining that the first path is associated with a private network and the second path is associated with a public network;
determining, in response to determining that the first path is associated with the private network and the second path is associated with the public network, a source interface associated with the IP packet;
determining that the source interface matches an egress interface associated with the first path; and
communicating the IP packet based on the first path to the destination using the egress interface.

9. The method of claim 8, further comprising detecting an identifier for the source interface within an auxiliary header for the IP packet to determine the source interface associated with the IP packet.

10. The method of claim 8, further comprising performing a source address lookup of the IP packet in a Forwarding information Base (FIB) to determine the source interface associated with the IP packet, wherein the FIB associates a source address with the source interface.

11. The method of claim 8, further comprising performing a source address lookup of the IP packet in a database to determine the source interface associated with the IP packet, wherein the database maps a source address to the source interface.

12. The method of claim 8, wherein:
the IP packet is an Internet Protocol version 4 (IPv4) packet or an Internet Protocol Version 6 (IPv6) packet;
the IP packet is a locally sourced IP packet having a private IP source address; and
the first path to the destination includes a wide area network (WAN) having a private IP address.

13. The method of claim 8, wherein:
the first path is associated with a private IP address; and
the second path is associated with a public IP address.

14. The method of claim 8, wherein the source interface is:
specified by an application running on the router; or
determined by performing a route lookup in a routing table.

15. One or more computer-readable non-transitory storage media embodying instructions that, when executed by a processor, cause the processor to perform operations comprising:
identifying a first path and a second path for forwarding an IP packet to a destination associated with a destination address;
determining that the first path is associated with a private network and the second path is associated with a public network;
determining, in response to determining that the first path is associated with the private network and the second path is associated with the public network, a source interface associated with the IP packet;
determining that the source interface matches an egress interface associated with the first path; and
communicating the IP packet based on the first path to the destination using the egress interface.

16. The one or more computer-readable non-transitory storage media of claim 15, the operations further comprising detecting an identifier for the source interface within an auxiliary header for the IP packet to determine the source interface associated with the IP packet.

17. The one or more computer-readable non-transitory storage media of claim 15, the operations further comprising performing a source address lookup of the IP packet in a Forwarding information Base (FIB) to determine the source interface associated with the IP packet, wherein the FIB associates a source address with the source interface.

18. The one or more computer-readable non-transitory storage media of claim 15, the operations further comprising performing a source address lookup of the IP packet in a database to determine the source interface associated with the IP packet, wherein the database maps a source address to the source interface.

19. The one or more computer-readable non-transitory storage media of claim 15, wherein:
- the IP packet is an Internet Protocol version 4 (IPv4) packet or an Internet Protocol Version 6 (IPv6) packet;
- the IP packet is a locally sourced IP packet having a private IP source address; and
- the first path to the destination includes a wide area network (WAN) having a private IP address.

20. The one or more computer-readable non-transitory storage media of claim 15, wherein:
- the first path is associated with a private IP address; and
- the second path is associated with a public IP address.

\* \* \* \* \*